United States Patent [19]
Fetchin et al.

[11] 3,886,213
[45] May 27, 1975

[54] PREPARING AND STORING OF REDUCED COPPER CATALYST

[75] Inventors: John Allan Fetchin; William Frank Marzluff; William Austin Barber, all of Stamford, Conn.

[73] Assignee: American Cyanamid Company, Stamford, Conn.

[22] Filed: Sept. 7, 1973

[21] Appl. No.: 395,301

[52] U.S. Cl....... 260/561 N; 260/558 R; 260/561 R
[51] Int. Cl. ......................................... C07c 103/08
[58] Field of Search .................... 260/561 N, 561 R

[56] References Cited
UNITED STATES PATENTS

| | | | |
|---|---|---|---|
| 3,758,578 | 9/1973 | Habermann et al. | 260/561 N |
| 3,767,706 | 10/1973 | Habermann et al. | 260/561 N |

*Primary Examiner*—Lewis Gotts
*Assistant Examiner*—Ethel G. Love
*Attorney, Agent, or Firm*—Gordon L. Hart

[57] ABSTRACT

For catalytic hydration of nitriles to produce amides, reduced copper catalysts prepared for use in the process are found to have improved catalytic activity if, while still freshly reduced, the copper catalyst is washed in aqueous nitrite solution. The reduced copper catalyst will retain catalytic activity better during storage if kept immersed in aqueous solution of nitrite until the catalyst is used. Examples demonstrate the invention using the improved catalysts for catalytic hydration of acrylonitrile to produce acrylamide. Washing and storage of catalysts in several aqueous solution ranging from 0.001 to 1 molar sodium nitrite are exemplified.

18 Claims, 1 Drawing Figure

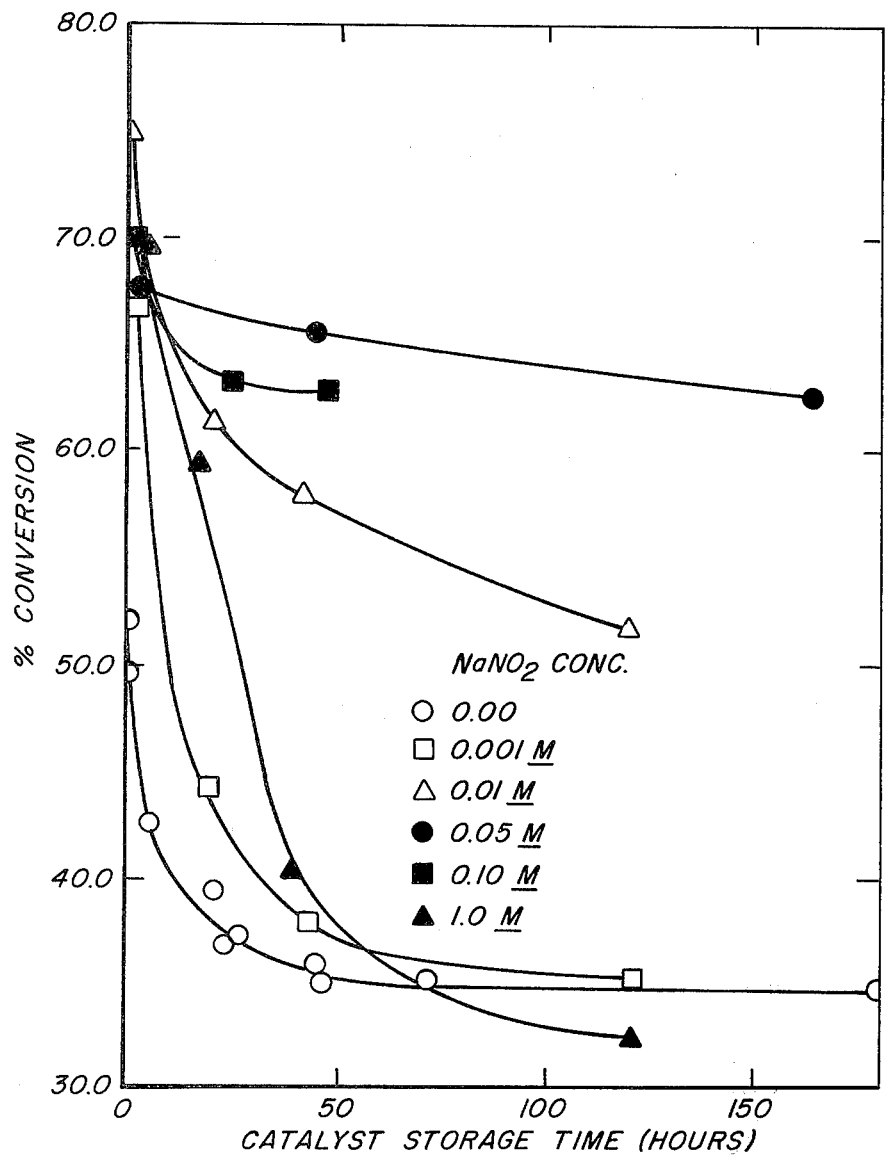

PREPARING AND STORING OF REDUCED COPPER CATALYST

The invention relates to improvements in catalysts for use in hydration of nitriles to produce amides. More particularly, the invention provides improvements in copper catalysts for hydration of nitriles.

Use of copper catalysts in catalytic hydration of nitriles to produce amides has been nown for several years. Improved conversion and yields are obtained using freshly reduced copper in a physical form having high surface area. An especially preferred catalyst is prepared by reduction of copper using a borohydride reducing agent in aqueous solution. For example, copper prepared by reduction of copper sulfate in aqueous solution with sodium borohydride precipitate in particulate aggregates of extremely finely divided copper. This copper is found to be an unusually active copper for catalytic hydration especially when the catalyst is used is freshly prepared.

The catalytic activity of reduced copper catalyst deteriorates from the time the catalyst is freshly reduced until it is used as catalyst. An object of the invention is to provide novel means for inhibiting this deterioration of catalytic activity during catalyst storage.

We have surmised that the loss of catalyst activity during storage of the catalyst results from oxidation of copper at the active sites of the catalyst surface. Accordingly the prepared catalyst has been stored in dearated water under an atmosphere of an inert gas such as nitrogen, argon or the like.

While this method of storage provided some protection, still the loss of catalyst activity in storage was less than satisfactory.

We then discovered that storage of the freshly prepared copper catalyst in dilute nitrite aqueous solution will cause significantly improved retention of catalyst activity during storage of the catalyst before use. Furthermore, it has been discovered that when freshly prepared copper catalyst is washed with dilute nitrite aqueous solution and used immediately as catalyst, the initial activity of the copper catalyst is significantly improved as compared with the same copper catalyst washed in water having no additives.

The nitrite solution may be prepared by dissolving a soluble inorganic nitrite, e.g. an alkali metal nitrite, in water. We prefer to use sodium nitrite. The improvement of storage stability appears to be the best when using solutions with concentrations in the range from about 0.01 to about 0.1 molar nitrite for the aqueous storage solution. For improvement of the catalyst activity by washing the freshly prepared catalyst in nitrite solution, the effective nitrite salt concentration in the wash solution appears less critical and substantial improvement of activity was obtained with all of the nitrite concentrations used as compared with controls in which no nitrite was used. The drawing is a graph showing several test results expressed as percent conversions of acrylonitrile to acrylamide that were obtained using several freshly prepared copper catalysts as well as copper catalysts prepared and stored for various periods before they were used in the catalytic hydration process.

For the specific examples described below, the copper catalysts were prepared by reduction of copper from aqueous solutions of copper sulfate using borohydride reducing agent but the invention can be used for preparation and storage of other reduced copper catalysts of the kind intended for use in catalytic hydration of nitriles. Such other copper catalysts include reduced Adkins catalyst, Raney copper, Urushibara copper and the like. Copper on catalyst supports can similarly be treated and stored and used in accordance with the invention.

For the specific examples herein, the nitrile selected for the catalytic hydration is acrylonitrile but the invention is useful for improving catalytic activity of reduced copper catalysts for the catalytic hydration of other nitriles with water. For example the improved catalyst is useful for the hydration of methacrylonitrile, benzonitrile, acetonitrile, butyronitrile and the like in similar hydration process to produce corresponding amides. Following are specific examples illustrating the most preferred mode of carrying out the invention with control examples for comparison to demonstrate the advantages obtained by the invention.

EXAMPLES

Catalyst samples are prepared by dissolving 28.3 g dextrose and 39.3 g $CuSO_4 \cdot 5H_2O$ in 250 ml. water. One liter of 0.47 M NaOH is added during rapid stirring. Afterwards, 100 ml. 0.1 N NaOH containing 3.0 g $NaBH_4$ is added, and the mixture is stirred for 15 minutes. The solid copper catalyst product is separated by filtration, washed with 3,000 ml. $H_2O$ (or an equivalent volume of a nitrite salt solution), and stored in a 200 ml. unused portion of the same wash solution which has been previously argon purged. Periodically, a sample of the copper catalyst is removed and the sample is washed with 300 ml. $H_2O$ in those instances where a salt solution has been used for the 3,000 ml. wash solution. This portion is immediately used in the hydration test.

The hydration test procedure consists of adding a catalyst sample (0.4 – 0.6 g) prepared and stored as described to 10 g $H_2O$ and 0.6 acrylonitrile in a test tube, stoppering, and shaking the mixture for 0.5 hr. at 57°C. The catalyst is then separated from the reaction solution by centrifuge, and the weight of catalyst is measured by a quantitative copper determination. Gas chromatographic analysis is used to determine the concentration of acrylonitrile and acrylamide in the separated product solution.

The data in Table I indicate the percent conversion of acrylonitrile to acrylamide obtained with each catalyst portion used in the hydration tests, based on 1.0 g catalyst, 10.0 g $H_2O$, and 0.6 g acrylonitrile shaken at 57°C. for 0.5 hr. The drawing is a graphic plot of the data presented in Table I.

TABLE I

| Washing and Storage Solution | Catalyst Storage (hrs.) | % Conversion Acrylonitrile to Acrylamide |
|---|---|---|
| $H_2O$ | 1 | 52.0 |
| | 1 | 49.5 |
| | 5 | 42.5 |
| | 20 | 39.2 |
| | 22.5 | 36.8 |
| | 26 | 37.2 |
| | 45 | 35.7 |
| | 46.5 | 37.0 |
| | 69 | 35.0 |
| | 194 | 34.5 |
| 0.001 M) $NaNO_2$ ) | 1 | 66.8 |

TABLE I-Continued

| Washing and Storage Solution | Catalyst Storage (hrs.) | % Conversion Acrylonitrile to Acrylamide |
|---|---|---|
| | 19 | 44.3 |
| | 43 | 38.0 |
| | 120 | 35.0 |
| 0.01 M) NaNO$_2$ ) | 1 | 75.2 |
| | 18 | 61.2 |
| | 42 | 58.0 |
| | 120 | 51.7 |
| 0.05 M) NaNO$_2$ ) | 1 | 67.7 |
| | 44 | 65.6 |
| | 164 | 62.6 |
| 0.10 M) NaNO$_2$ ) | 1 | 70.0 |
| | 24 | 63.2 |
| | 48 | 62.9 |
| 1.0 M) NaNO$_2$) | 1 | 70.3 |
| | 17.5 | 59.3 |
| | 41.5 | 40.2 |
| | 120 | 32.3 |

The foregoing examples demonstrate the improved catalytic activity of copper catalysts that were washed and stored in accordance with the invention. As stated before, the invention can be used to advantage more generally for the preparation and storage of other reduced copper hydration catalysts and for such catalysts to be used for the hydration of other nitriles to produce corresponding other amides.

We claim:

1. In the catalytic hydration of a nitrile with water to produce a corresponding amide wherein the catalysts for said hydration is reduced copper, selected from the group consisting of reduced copper sulfate, reduced Adkins catalyst, Raney copper, and Urushibara copper the improvement wherein the copper catalyst is one that has been separated from the reduction medium and subsequently washed with aqueous alkali metal nitrite solution while the reduced copper catalyst is still freshly reduced.

2. An improved process defined by claim 1 wherein the defined catalyst is used for the catalytic hydration reaction while the catalyst is still freshly reduced and after the defined wash with nitrite solution.

3. An improved process defined by claim 1 wherein the defined catalyst after the defined wash in nitrite solution is stored for a period of hours while immersed in aqueous nitrite solution of concentration in the range from about 0.01 to about 0.1 molar nitrite.

4. An improved process defined by claim 1 wherein the defined nitrile is acrylonitrile and the product is acrylamide.

5. An improved process defined by claim 2 wherein the defined nitrile is acrylonitrile and the product is acrylamide.

6. An improved process defined by claim 3 wherein the defined nitrile is acrylonitrile and the product is acrylamide.

7. An improved process defined by claim 4 wherein the defined aqueous nitrite solution is aqueous solution of sodium nitrite.

8. An improved process defined by claim 5 wherein the defined aqueous nitrite solution is aqueous solution of sodium nitrite.

9. An improved process defined by claim 6 wherein the defined aqueous nitrite solution is aqueous solution of sodium nitrite.

10. An improved process defined by claim 1 wherein the defined reduced copper catalyst is copper prepared by reduction of copper ion of copper sulfate in aqueous solution by means of a borohydride reducing agent in aqueous solution.

11. An improved process defined by claim 10 wherein the defined catalyst is used for the catalytic hydration reaction while the catalyst is still freshly reduced and after the defined wash with nitrite solution.

12. An improved process defined by claim 10 wherein the defined catalyst after the defined wash in nitrite solution is stored for a period of hours while immersed in aqueous nitrite solution of concentration in the range from about 0.01 to about 0.1 molar nitrite.

13. An improved process defined by claim 10 wherein the defined nitrile is acrylonitrile and the product is acrylamide.

14. An improved process defined by claim 11 wherein the defined nitrile is acrylonitrile and the product is acrylamide.

15. An improved process defined by claim 12 wherein the defined nitrile is acrylonitrile and the product is acrylamide.

16. An improved process defined by claim 13 wherein the defined aqueous nitrite solution is aqueous solution of sodium nitrite.

17. An improved process defined by claim 14 wherein the defined aqueous nitrite solution is aqueous solution of sodium nitrite.

18. An improved process defined by claim 15 wherein the defined aqueous nitrite solution is aqueous solution of sodium nitrite.

* * * * *